United States Patent
Lin et al.

(10) Patent No.: US 6,961,218 B1
(45) Date of Patent: Nov. 1, 2005

(54) DISK DRIVE ACTUATOR ARM ASSEMBLY HAVING ONE OR MORE SLOTTED ACTUATOR ARMS

(75) Inventors: Chen-Chi Lin, San Jose, CA (US); Chunjer C. Cheng, Saratoga, CA (US)

(73) Assignee: Western Digital Technologies, Inc., Lake Forest, CA (US)

( * ) Notice: Subject to any disclaimer, the term of this patent is extended or adjusted under 35 U.S.C. 154(b) by 239 days.

(21) Appl. No.: 10/306,978

(22) Filed: Nov. 27, 2002

(51) Int. Cl.[7] .................................................. G11B 5/54
(52) U.S. Cl. ..................................................... 360/266
(58) Field of Search .......................... 360/265.7, 265.9, 360/266, 266.1

(56) References Cited

U.S. PATENT DOCUMENTS

| | | | |
|---|---|---|---|
| 5,666,243 A | 9/1997 | Brent | |
| 5,864,444 A | 1/1999 | Baker et al. | |
| 6,498,704 B1 | 12/2002 | Chessman et al. | |
| 2002/0186511 A1 * | 12/2002 | Tsuda et al. | 360/265.9 |
| 2002/0186512 A1 * | 12/2002 | Kuboteria et al. | 360/266 |

* cited by examiner

*Primary Examiner*—Angel Castro
(74) *Attorney, Agent, or Firm*—Alan W. Young, Esq.

(57) ABSTRACT

A disk drive, includes a disk and a head stack assembly for reading and writing to the disk. The head stack assembly includes a body portion defining a through bore that defines a pivot axis; an actuator arm cantilevered from the body portion, the actuator arm defining a thickness, the actuator arm defining at least one through slot in the thickness thereof through which air can flow, each through slot defining a slot surface that is generally perpendicular to the pivot axis; a coil portion cantilevered from the body portion in an opposite direction from the actuator arm, and a head gimbal assembly coupled to the actuator arm.

6 Claims, 4 Drawing Sheets

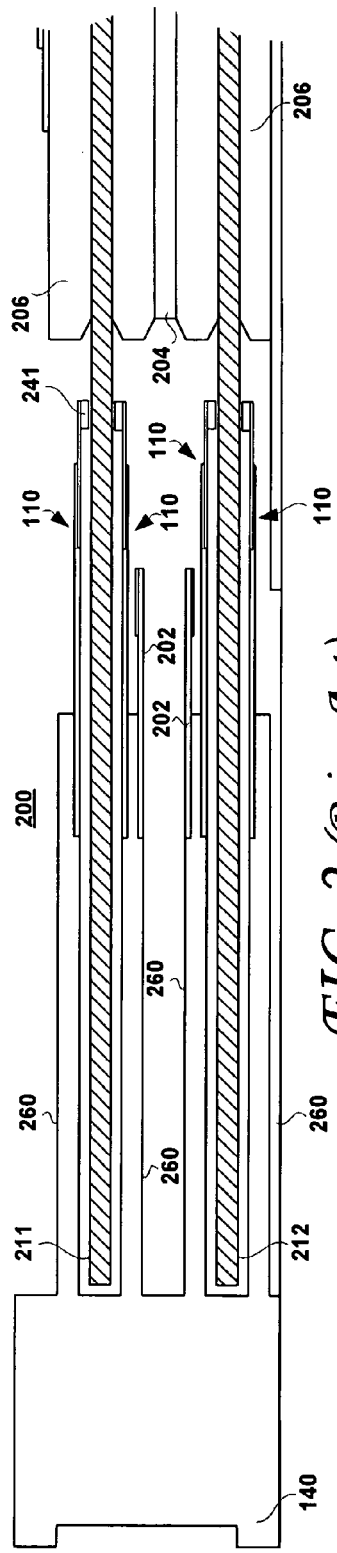
FIG. 2 (Prior Art)
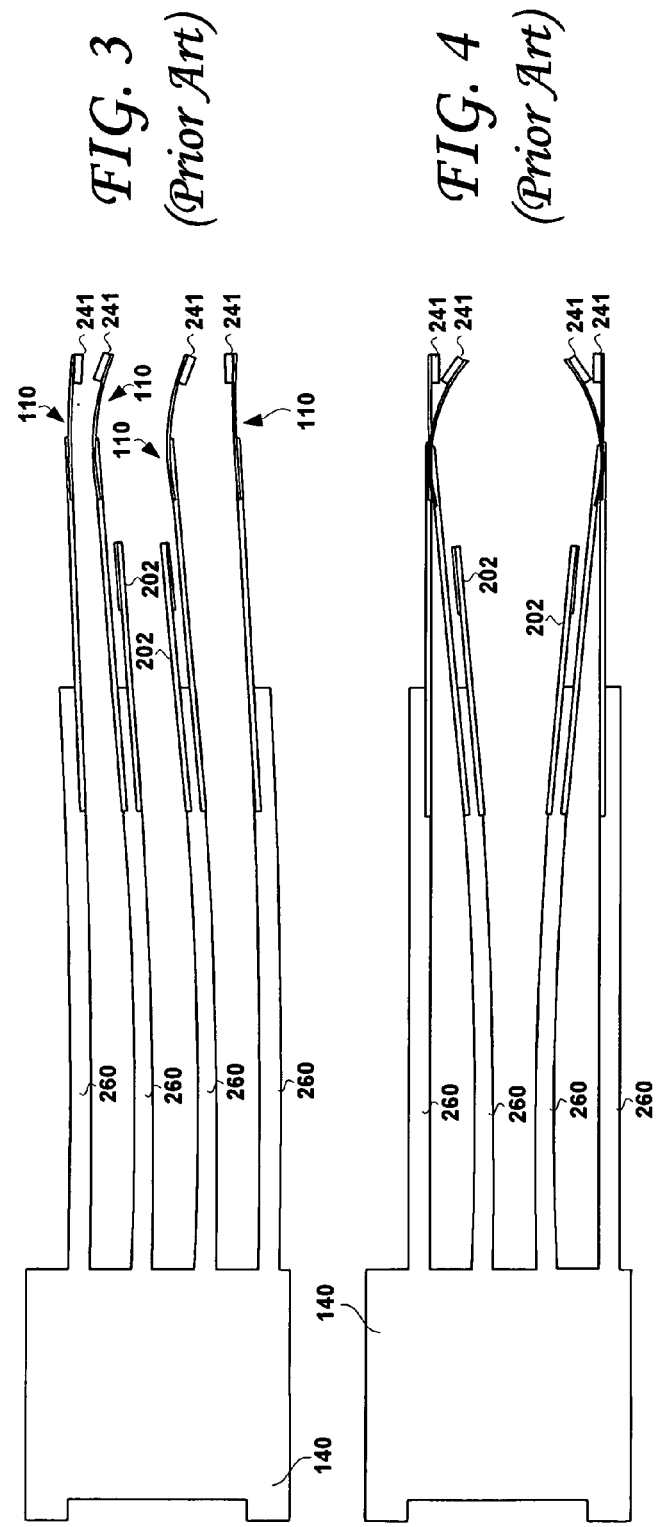
FIG. 3 (Prior Art)
FIG. 4 (Prior Art)

DISK DRIVE ACTUATOR ARM ASSEMBLY HAVING ONE OR MORE SLOTTED ACTUATOR ARMS

FIELD OF THE INVENTION

This invention relates to magnetic disk drives. More particularly, the present invention relates to disk drives, disk drive head stack and actuator arm assemblies in which one or more actuator arm defines a through slot to increase the stiffness of the actuator assembly.

DESCRIPTION OF THE PRIOR ART AND RELATED INFORMATION

Magnetic disk drives, such as those used for mass storage in personal computer systems are well known. Generally, disk drives include a head disk assembly (HDA) and a controller printed circuit board (PCBA). The HDA includes a cover, a base, one or more disks, a head stack assembly (HSA) that includes an actuator assembly, head gimbal assembly (HGA) and a flex circuit. The HSA rotatably positions a slider having one or more transducers over a disk. A spindle motor spins the disks. FIG. 2 is a simplified side view of a conventional head disk assembly 200. The head disk assembly 200 includes a HSA that includes an actuator assembly 230 and a HGA 110. The actuator assembly 230 includes a body portion 240, a plurality of actuator arms 260 (four such actuator arms 260 being shown in FIGS. 2, 3 and 4) cantilevered from the body portion 240. The actuator assembly 230 also includes a voice coil motor (VCM), which VCM is not shown in FIGS. 2–4. The HSA is pivotally attached to the base of the drive 216. Each HGA 110 is attached to a respective actuator arm 260 and supports a slider, such as shown at 241. A plurality of disks (only two disks 211 and 212 are shown in FIGS. 2–4), are clamped to a spindle motor (not shown in FIGS. 2–4) and are separated by spacers 206. The head disk assembly 200 of FIG. 2 is a constituent element of a so-called "depopulated" drive. In a depopulated drive, one or more disks are removed or omitted and replaced with an additional spacer, as shown in FIG. 2 at reference numeral 204. Middle spacers 206, 204 and 206 may be combined into a single spacer. Although the head stack assembly is configured to read and write to as many as three disks (each with two recording surfaces), the HDA 200 of FIG. 2 has been configured to read and write to only two disks 211 and 212. The two middle actuator arms 260 do not require a full complement of HGAs 110. These unnecessary HGAs 110 may, therefore, be omitted to save on fabrication and assembly costs. As each actuator arm 260 is configured to support two HGAs 110 on opposite faces thereof, the absence of an HGA 110 from one face unbalances the actuator arm 260. To compensate for such missing HGA 110, weights 202 are conventionally attached to and cantilevered from the actuator arms 260 from which a HGA 110 is missing. The weights 202 are configured so as to have the same or substantially the same mechanical properties as the missing HGAs 110, such that the overall mechanical characteristics of the HDA 200 are substantially unchanged.

FIGS. 3 and 4 show the mode shapes of the HSA at two different frequencies, which may manifest themselves during normal operation of the drive or during a shock event. FIG. 3 illustrates the case wherein the HSA undergoes a first bending mode in which the middle two actuator arms 260 bend in the same direction. The motion of the two middle actuator arms 260 shown in FIG. 3 is an in-phase motion, in that the arms 260 bend in the same direction at or near the same time. The bending of the arms in FIGS. 3 and 4 has been vastly exaggerated to better illustrate the mode shapes and some of the problems inherent in conventional depopulated drives. This first in-phase bending mode has been observed in current generation drives at about 906 Hz. FIG. 4 shows the same HSA experiencing an out-of-phase first bending mode, in that the actuator arms are bending in opposite directions. This first out-of-phase bending mode has been observed at an excitation frequency of about 943 Hz. As the actuator arms 260 are not and cannot be made to be perfectly stiff, these bending modes occur as the actuator arms 260 bend in response to a given excitation frequency or frequency range. Stiffening the actuator arms 260, all other aspects thereof remaining the same, tends to beneficially increase the frequencies at which the arms 260 bend and tends to correspondingly reduce the amplitude of such vibrations. The stiffer the actuator arms 260 can be made, the higher the frequencies will be at which the actuator arms 260 will bend.

Such bending and torsion modes interfere with the drive's reading and writing activities, and typically slow down the drive's seek time performance. To address such bending and torsion modes, a notch filter or filters tuned to the bending and torsion mode frequencies may be used in the drive's servo to attenuate signals at these frequencies, to the detriment of available servo bandwidth. Moreover, it is easier to attenuate higher frequencies without unacceptable loss of signal amplitude, as it is to attenuate unwanted bending and torsion modes frequencies at comparatively lower frequencies. From the foregoing, it may be appreciated that there is a clear need for shifting the first bending mode frequencies higher. Doing so would decrease drive seek times and decrease the degradation of servo bandwidth caused by such bending and torsion modes, among other benefits.

SUMMARY OF THE INVENTION

According to one aspect thereof, this invention can be regarded as a head stack assembly for a disk drive. The head stack assembly may include a body portion defining a through bore that defines a pivot axis; an actuator arm cantilevered from the body portion, the actuator arm defining a thickness, the actuator arm defining at least one through slot in the thickness thereof through which air can flow, each through slot defining a slot surface that is generally perpendicular to the pivot axis. A coil portion is cantilevered from the body portion in an opposite direction from the actuator arm and a head gimbal assembly coupled to the actuator arm.

The actuator arm defines a free end that is furthest away from the actuator body and the through slot(s) may be defined within the thickness of the actuator arm between the body portion and the free end. The through slot may be configured such that the actuator arm is bifurcated and defines a first and a second actuator arm tine. The first actuator arm tine may be mechanically coupled to the second actuator arm tine by an intra-actuator arm spacer attached to the first and second actuator arm tine.

The present invention is also an actuator arm assembly for a disk drive, the actuator arm assembly comprising a body portion defining a through bore that defines a pivot axis; an actuator arm cantilevered from the body portion, the actuator arm defining a thickness, the actuator arm defining at least one through slot in the thickness thereof through which air can flow, each through slot defining a slot surface that is generally perpendicular to the pivot axis, and a coil portion cantilevered from the body portion in an opposite direction from the actuator arm.

The actuator arm defines a free end that is furthest away from the actuator body and the through slot(s) may be defined within the thickness of the actuator arm between the body portion and the free end. The through slot may be configured such that the actuator arm is bifurcated and defines a first and a second actuator arm tine, the first actuator arm tine being mechanically coupled to the second actuator arm tine by an intra-actuator arm spacer attached to the first and second actuator arm tine.

According to another embodiment thereof, the present invention is a disk drive, comprising a disk and a head stack assembly for reading and writing to the disk. The head stack assembly includes a body portion defining a through bore that defines a pivot axis; an actuator arm cantilevered from the body portion, the actuator arm defining a thickness, the actuator arm defining at least one through slot in the thickness thereof through which air can flow, each through slot defining a slot surface that is generally perpendicular to the pivot axis; a coil portion cantilevered from the body portion in an opposite direction from the actuator arm, and a head gimbal assembly coupled to the actuator arm.

The actuator arm defines a free end that is furthest away from the actuator body and the through slot(s) may be defined within the thickness of the actuator arm between the body portion and the free end. The through slot(s) may be configured such that the actuator arm is bifurcated and defines a first and a second actuator arm tine, the first actuator arm tine being mechanically coupled to the second actuator arm tine by an intra-actuator arm spacer attached to the first and second actuator arm tine.

FIG. 8 is a cross-sectional view showing the pivot-bearing cartridge and a portion of the body portion of the actuator assembly, according to another embodiment of the present invention.

BRIEF DESCRIPTION OF THE DRAWINGS

FIG. 2 is a simplified side view of a conventional depopulated head disk assembly.

FIG. 3 shows the head stack assembly of the depopulated head disk assembly of FIG. 2, undergoing an in-phase first bending mode (the amplitude of the bending is exaggerated for illustrative purposes).

FIG. 4 shows the head stack assembly of the depopulated head disk assembly of FIG. 2, undergoing an out-of-phase first bending mode (the amplitude of the bending is exaggerated for illustrative purposes).

DESCRIPTION OF PREFERRED EMBODIMENTS

Figure 1:
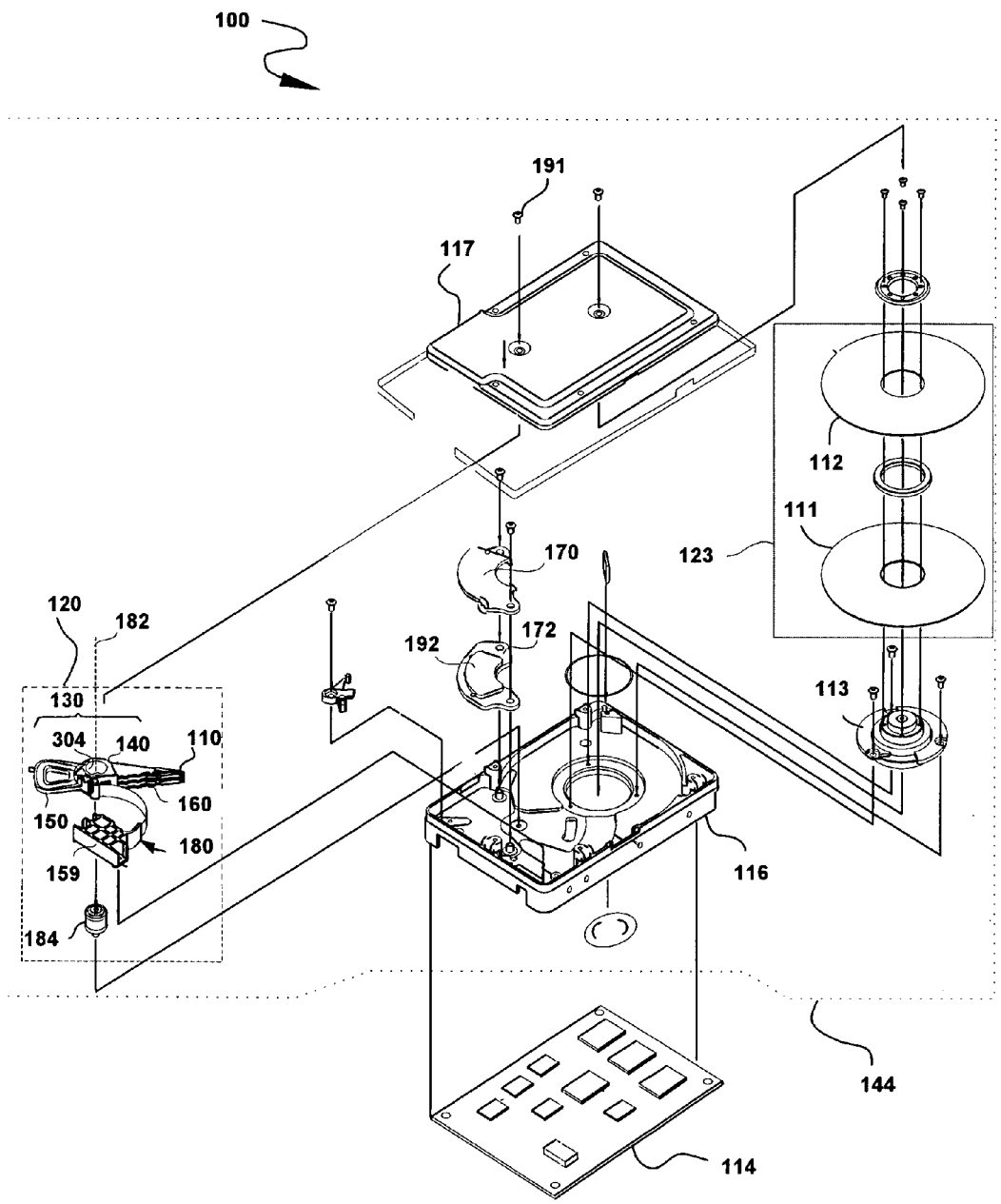
FIG. 1 is a diagram of the major components of a disk drive according to an embodiment of the present invention.

FIG. 1 shows the principal components of a magnetic disk drive 100 that incorporates aspects of the present invention. With reference to FIG. 1, the disk drive 100 comprises a HDA 144 and a PCBA 114. The HDA 144 includes a disk drive enclosure comprising base 116 and a cover 117 attached to the base 116 that collectively house a disk stack 123 that includes one or a plurality of magnetic disks (of which only a first disk 111 and a second disk 112 are shown), a spindle motor 113 attached to the base 116 for rotating the disk stack 123, an HSA 120, and a pivot bearing cartridge 184 that rotatably supports the HSA 120 on the base 116. The spindle motor 113 rotates the disk stack 123 at a constant angular velocity. The HSA 120 comprises a swing-type or rotary actuator assembly 130, at least one HGA 110, and a flex circuit cable assembly 180. The rotary actuator assembly 130 includes a body portion 140, at least one actuator arm 160 cantilevered from the body portion 140, and a coil portion 150 cantilevered from the body portion 140 in an opposite direction from the actuator arm 160. According to the present invention, at least one of the actuator arms 160 of the rotary actuator assembly 130 is slotted, as is described in detail below with reference to FIGS. 5, 6, 7 and 8. The actuator arm 160 supports the HGA 110 that, in turn, supports the slider(s). Each slider (shown at 141 in FIGS. 5, 6, 7 and 8) includes read and write transducers for reading from and writing to the recording surface(s) of the disks 111, 112. The flex cable assembly 180 may include a flex circuit cable and a flex clamp 159. The HSA 120 is pivotally secured to the base 116 via the pivot-bearing cartridge 184 so that the slider at the distal end of the HGA 110 may be moved over the surfaces of the disks 111, 112. The pivot-bearing cartridge 184 enables the HSA 120 to pivot about a pivot axis, shown in FIG. 1 at reference numeral 182. The storage capacity of the HDA 144 may be increased by, for example, increasing the track density (the number of tracks per inch or TPI) on the disks 111, 112 and/or by including additional disks in the disk stack 123 and by an HSA 120 having a vertical stack of HGAs 110 supported by multiple actuator arms 160.

The "rotary" or "swing-type" actuator assembly comprises a body portion 140 that rotates on the pivot bearing 184 cartridge between limited positions, a coil portion 150 that extends from one side of the body portion 140 to interact with one or more permanent magnets 192 mounted to back irons 170, 172 to form the voice coil motor (VCM), and the actuator arm 160 that supports the HGA 110. The VCM causes the HSA 120 to pivot about the actuator pivot axis 182 to cause the slider and the read write transducers thereof to sweep radially over the disk(s) 111, 112.

Figure 5:
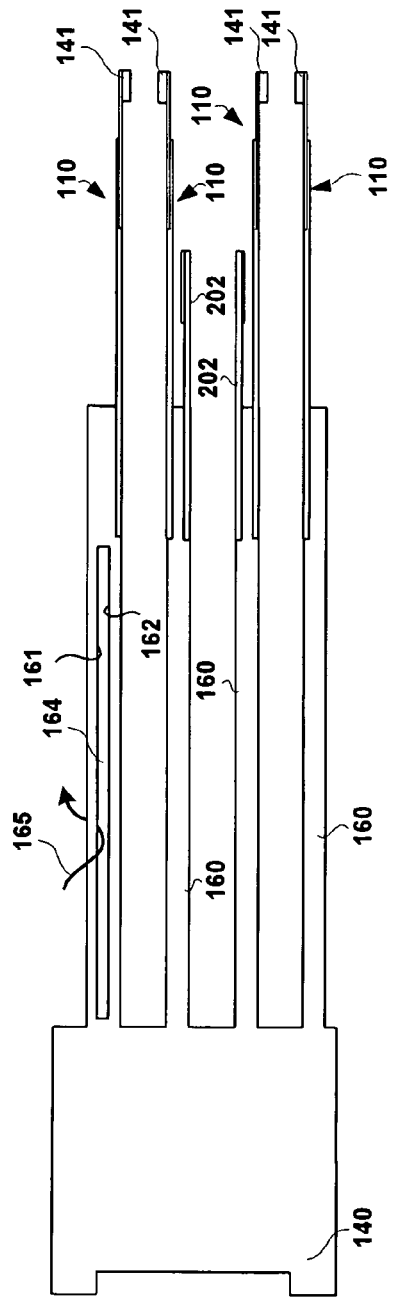
FIG. 5 shows a head stack assembly including an actuator arm assembly that defines a through slot in a constituent actuator arms thereof, according to an embodiment of the present invention.

FIG. 5 shows a head stack assembly according to an embodiment of the present invention. In FIG. 5, elements that find counterparts in FIG. 1 are identified by the same reference numeral. FIG. 5, therefore, shows an actuator assembly 130 including a plurality of actuator arms 160 cantilevered from the actuator body 140. As shown, one or more of the actuator arm 160 includes one or more through slots 164 within the thickness thereof. That is, each actuator arm 160 defines a thickness, and one or more of the actuator arms 160 defines at least one through slot 164 in the thickness thereof through which air can flow, as suggested by arrow 165. Each through slot 164 defines a slot surface 161, 162. The slot surface(s) 161, 162 defined by the through slot(s) 164 is/are generally perpendicular to the pivot axis of the head stack assembly. The actuator arm defines a free end that is furthest away from the actuator body 140 and the through slot(s) is/are defined and located within the thickness of the actuator arm 160 between the body portion 140 and the free end. FIG. 5 shows a single actuator arm 160 that defines a single through slot 164. However, selected ones or all of the actuator arms 160 may include and define one or more of such slots 164 within their respective thickness.

Figure 6:
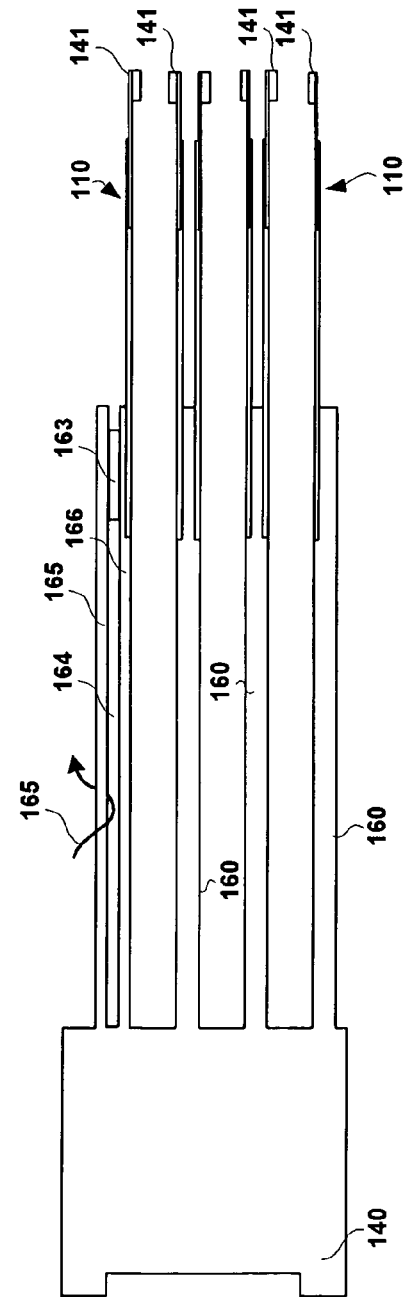
FIG. 6 shows a head stack assembly including an actuator arm assembly that defines a through slot in a constituent actuator arms thereof, according to another embodiment of the present invention.

FIG. 6 is an illustration of a head stack assembly according to another embodiment of the present invention. As shown, the through slot 164 is configured such that the actuator arm 160 is bifurcated so as to define a first actuator arm tine 165 and a second actuator arm tine 166. As shown, the first actuator arm tine 165 is mechanically coupled to the second actuator arm tine 166 by an intra-actuator arm spacer 163 attached to the first and second actuator arm tines 165, 166. Although FIG. 6 shows only a single bifurcated actuator arm 160, selected ones or all of the actuator arms 160 of the actuator arm assembly 130 may be so bifurcated, and their respective first and second actuator arm tines may be mechanically linked to one another by respective intra-actuator arm spacers 163. As shown, the present invention may be advantageously applied to depopulated disk drives, an exemplary HSA of which is shown at FIG. 5. However, the present invention may also be applied to fully populated drives in which none of the HGAs have been removed or omitted, as shown at FIG. 6.

Figure 7:
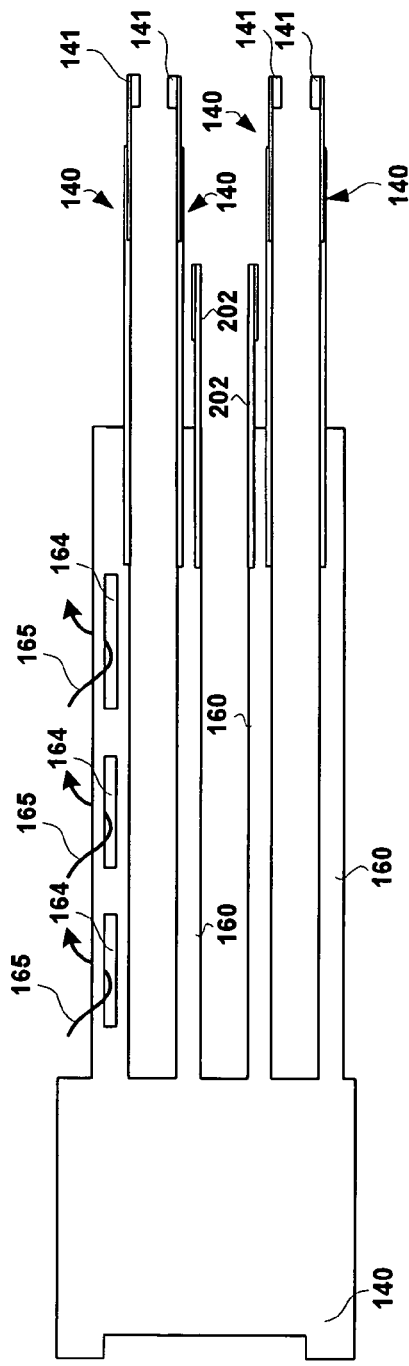
FIG. 7 shows a head stack assembly including an actuator arm assembly that defines a plurality of through slots in a constituent actuator arms thereof, according to still another embodiment of the present invention.

FIG. 7 shows yet another embodiment of the present invention. In FIG. 7, one of the actuator arms defines a plurality of slots 164 within its thickness. The thickness of the slotted actuator arms 160 may be selected to take the voids created by the slot(s) 164 into account such that the slotted arm has the same or substantially the same inertia as a comparable, non-slotted actuator arm, such as the bottom actuator arm. In this embodiment, the actuator arm 160 defines a plurality of slots through which air can flow, as suggested by the arrows referenced by numeral 165. As shown, the slots 164 may be formed along with the actuator arms 160 or may be formed by a larger slot in which one or more intra-actuator arm spacers 163 have been inserted. All or 11 selected ones of the actuator arms of the actuator assembly may define a plurality of slots 164.

The slot or slots 164 defined within the actuator arm or arms 160 have a beneficial effect upon the disk drive. At the outset, the presence of the slot or slots 164 increase the surface area of the actuator arms 160, which enables the actuator assembly to more efficiently dissipate heat. Moreover, the slot or slots 164 increase the stiffness of the actuator arms 160 and that of the actuator assembly. A stiffer actuator arm 160 has the effect of pushing first bending modal frequencies higher, thereby decreasing the amplitude of the resulting vibrations. Such higher first bending mode (both in-phase and out-of-phase) frequencies are easier to compensate for using notch filters in the servo, or by other compensating, filtering or damping means.

Figure 8:
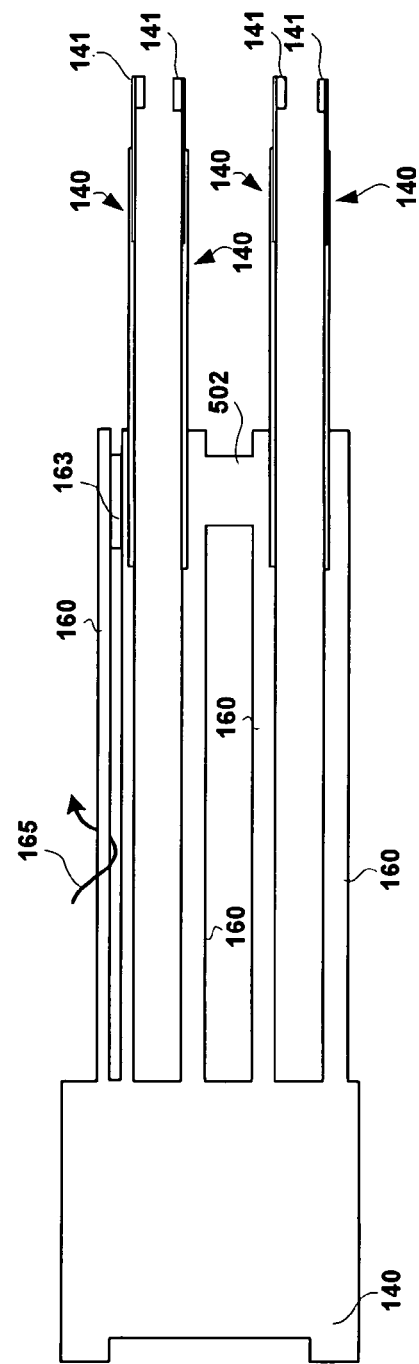
FIG. 8 shows the head stack assembly of FIG. 6, further including an actuator arm spacer to further increase the stiffness of the actuator arm assembly.

The embodiment shown in FIG. 8 may be used in depopulated drives to fully eliminate the out-of-phase first bending mode and to further stiffen the actuator arms. FIG. 8 shows an HSA in which an actuator arms 160 is bifurcated and in which an intra-arm spacer 163 attaches to the first and second tines 165, 166 of the actuator arm 160, in the manner discussed above relative to FIG. 6. The HSA of FIG. 8 also includes an actuator arm spacer 502 to be disposed between two of the actuator arms 160 of the HSA and away from the body portion 140. The actuator arm spacer 502 mechanically links the actuator arms 160 between which it is disposed. The actuator arm spacer 502 does not interfere with the functioning of the drive, as there is no disk in the space spanned by the spacer 502. Preferably, the weight of the actuator arm spacer 502 is equal to (or substantially equal to) the aggregate weight of the missing two HGAs (for example, reference numerals 202 in FIG. 7) on the actuator arms to which the actuator arm spacer 502 is attached. The weight of the actuator arm spacer 502, therefore, is supported by two actuator arms 160, each arm supporting half of the weight of the actuator arm spacer 160. In this manner, the actuator arms 160 to which the actuator arm spacer 502 is attached remain balanced (and have the same or substantially the same inertia) as if the omitted HGAs were, in fact, attached thereto. The actuator arm spacer 502 may be a discrete element that is attached to two of the actuator arms 160 of the actuator assembly. To maximize the stiffness of the actuator arms 160 to which the actuator arm spacer 502 is attached, the actuator arm spacer 502 is preferably attached at or near the free ends of the actuator arms 160. That is, the actuator arm spacer 502 is preferably attached to the actuator arms 160 away from the body portion 140 and near the free ends of the actuator arms 160, in a manner that maximally increases the stiffness of the actuator arms 160 to which the actuator arm spacer 502 is attached. Placing the actuator arm spacer 502 closer to the actuator body portion 140 renders the actuator arms cantilevered again, thereby decreasing the stiffness thereof.

The actuator arm spacer 502, however, need not be a discrete element that is formed separately from the actuator arms 160 and later attached thereto. Indeed, the actuator arms spacer 502 may be integrally formed (e.g., cast) with the body portion 140 and to the actuator arms 160, as shown in FIG. 8. The actuator arm spacer 502 and the benefits to be derived therefrom are further described in copending and commonly assigned US patent application Ser. No. 10/306, 984, entitled "Head Stack And Actuator Arm Assemblies And Disk Drives Having An Actuator Including An Actuator Arm Spacer To Increase Actuator And Suspension Stiffness And To Reduce The Number Of Actuator Arm Resonance Modes", the disclosure of which is incorporated herewith in its entirety. For depopulated drives, any of the embodiments shown in FIGS. 5–7 may be combined with an actuator arm spacer 502 to further increase the stiffness of the actuator assembly.

Advantageously, the present invention shifts the frequency of the first bending mode and the first torsion mode higher, improves the position error signal, servo bandwidth and drive seek time. The first bending mode is the dominating mode that occurs during linear shock events. The present invention, therefore improves the drive's shock performance by increasing the frequency of the first arm bending mode.

We claim:

1. A head stack assembly for a disk drive, the head stack assembly comprising:

a body portion defining a through bore that defines a pivot axis;

an actuator arm cantilevered from the body portion, the actuator arm defining a thickness, the actuator arm defining at least one through slot in the thickness thereof though which air can flow, each through slot defining a slot surface that is generally perpendicular to the pivot axis, the through slot being configured such that the actuator arm is bifurcated and defines a first and a second actuator arm tine, the first actuator arm tine being mechanically coupled to the second actuator arm tine by an intra-actuator arm spacer attached to the first and second actuator arm tines;

a coil portion cantilevered from the body portion in an opposite direction from the actuator arm; and a head gimbal assembly coupled to the actuator arm.

2. The head stack assembly of claim 1, wherein the actuator arm defines a free end that is furthest away from the actuator body and wherein the at least one through slot is defined within the thickness of the actuator arm between the body portion and the free end.

3. An actuator arm assembly for a disk drive, the actuator arm assembly comprising:

a body portion defining a trough bore that defines a pivot axis;

an actuator arm cantilevered from the body portion, the actuator arm defining a thickness, the actuator arm defining at least one through slot in the thickness thereof through which air can flow, each through slot defining a slot surface that is generally perpendicular to the pivot axis, the through slot being configured such that the actuator arm is bifurcated and defines a first and a second actuator arm tine, the first actuator arm the being mechanically coupled to the second actuator arm tine by an intra-actuator arm spacer attached to the first and second actuator arm tines; and a coil portion cantilevered from the body portion in an opposite direction from the actuator arm.

4. The actuator arm assembly of claim 3, wherein the actuator arm defines a free end that is furthest away from the actuator body and wherein the at least one through slot is defined within the thickness of the actuator arm between the body portion and the free end.

5. A disk drive, comprising:

a disk;

a head stack assembly for reading and writing to the disk, the head stack assembly comprising:

a body portion defining a through bore that defines a pivot axis;

an actuator arm cantilevered from the body portion, the actuator arm defining a thickness, the actuator arm defining at least one through slot in the thickness thereof through which air can flow, each through slot defining a slot surface that is generally perpendicular to the pivot axis, the through slot being configured such that the actuator arm is bifurcated and defines a first and a second actuator arm tine, the first actuator arm tine being mechanically coupled to the second actuator arm tine by an intra-actuator arm spacer attached to the first and second actuator arm tines;

a coil portion cantilevered from the body portion in an opposite direction from the actuator arm; and a head gimbal assembly coupled to the actuator arm.

6. The disk drive of claim 5, wherein the actuator arm defines a free end that is furthest away from the actuator body and wherein the at least one through slot is defined within the thickness of the actuator arm between the body portion and the free end.

* * * * *